United States Patent
Ramesh et al.

(10) Patent No.: US 10,057,128 B2
(45) Date of Patent: Aug. 21, 2018

(54) BANDWIDTH ALLOCATION FOR SHARED NETWORK INFRASTRUCTURE

(71) Applicant: MaxLinear, Inc., Carlsbad, CA (US)

(72) Inventors: Sridhar Ramesh, Carlsbad, CA (US); Curtis Ling, Carlsbad, CA (US); Glenn Chang, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 774 days.

(21) Appl. No.: 14/245,532

(22) Filed: Apr. 4, 2014

(65) Prior Publication Data

US 2014/0317294 A1    Oct. 23, 2014

Related U.S. Application Data

(60) Provisional application No. 61/808,412, filed on Apr. 4, 2013.

(51) Int. Cl.
*G06F 15/173* (2006.01)
*H04L 12/24* (2006.01)

(52) U.S. Cl.
CPC .......... *H04L 41/0896* (2013.01); *H04L 41/12* (2013.01)

(58) Field of Classification Search
CPC ..... H04L 41/0896; H04L 41/12; H04W 16/14
USPC ....................................................... 709/226
See application file for complete search history.

(56) References Cited

U.S. PATENT DOCUMENTS

| | | | | |
|---|---|---|---|---|
| 8,854,966 | B2* | 10/2014 | Fadell | H04L 12/5695 370/232 |
| 2005/0246447 | A1* | 11/2005 | Smidt | H04L 12/2602 709/229 |
| 2009/0191889 | A1* | 7/2009 | Abedi | H04W 16/06 455/452.1 |
| 2010/0075704 | A1* | 3/2010 | McHenry | H04W 16/14 455/509 |
| 2011/0250916 | A1* | 10/2011 | Li | H04W 28/18 455/509 |
| 2012/0230328 | A1* | 9/2012 | Morrill | H04L 41/0896 370/389 |
| 2014/0073259 | A1* | 3/2014 | Schmidt | H04W 16/14 455/63.3 |

(Continued)

*Primary Examiner* — Frantz Jean
(74) *Attorney, Agent, or Firm* — McAndrews, Held & Malloy, Ltd.

(57) ABSTRACT

Methods and systems are provided for adaptive management of local networks (e.g., in-premises networks, which may access or be connected to cable or satellite networks). A network device (e.g., a gateway device) may be configured to function as a network manager in a local network, to manage internal connections and/or communications within the local network. The managing may comprise assessing effects of the internal connections and/or communications on external connections and/or communications with one or more devices and/or networks external the local network; and setting and/or adjusting based on the assessed effects, one or more communication parameters associated with each one of the internal connections and/or communications. The effects of the internal connections and/or communications may result from utilizing one or more physical mediums that are shared with and/or are commonly used by the external connections and/or communications with one or more devices and/or networks external the local network.

20 Claims, 5 Drawing Sheets

(56) References Cited

U.S. PATENT DOCUMENTS

2014/0307571 A1* 10/2014 Herzen ................ H04W 24/02
  370/252

* cited by examiner

BANDWIDTH ALLOCATION FOR SHARED NETWORK INFRASTRUCTURE

CLAIM OF PRIORITY

This patent application makes reference to, claims priority to and claims benefit from the U.S. Provisional Patent Application No. 61/808,412, filed on Apr. 4, 2013, which is hereby incorporated herein by reference in its entirety.

TECHNICAL FIELD

Aspects of the present application relate to communications. More specifically, certain implementations of the present disclosure relate to methods and systems for bandwidth allocation for shared network infrastructure.

BACKGROUND

Existing methods and systems for supporting communication in local networks (e.g., in-premises networks) that share physical mediums with external networks may be inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for bandwidth allocation for shared network infrastructure, substantially as shown in and/or described in connection with at least one of the figures, as set forth in the claims.

These and other advantages, aspects and novel features of the present disclosure, as well as details of illustrated implementation(s) thereof, will be more fully understood from the following description and drawings.

DETAILED DESCRIPTION

Certain example implementations may be found in method and system for non-intrusive noise cancellation in electronic devices, particularly in user-supported devices. As utilized herein the terms "circuits" and "circuitry" refer to physical electronic components ("hardware") and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
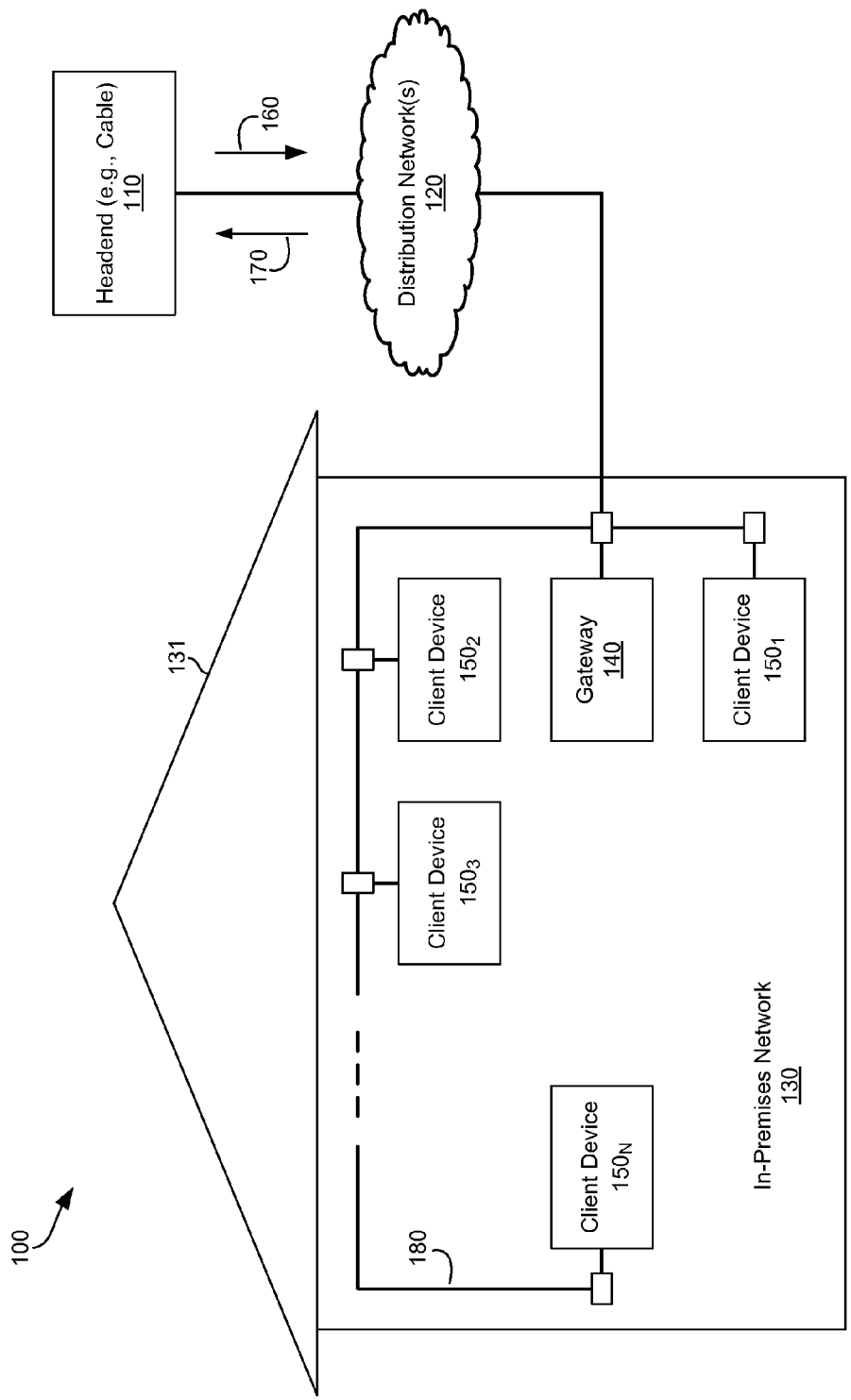
FIG. 1 illustrates an example distribution system, for providing content to an in-premises network.

FIG. 1 illustrates an example distribution system, for providing content to an in-premises network. Referring to FIG. 1, there is shown a communication system 100, comprising a headend 110, a distribution network 120, and an in-premises network 130.

The communication system 100 may comprise a plurality of devices (e.g., the headend 110 and a plurality of devices in the in-premises network 130 shown in FIG. 1), and communication resources (e.g., the distribution network 120, or resources therein) to enable the devices to communicate with one another (e.g., using connection via the distribution network 120). The communication system 100 may correspond to a distribution system, which may be used in distributing content and other data. In this regard, the communication system 100 may correspond to a cable and/or satellite distribution topology.

The headend 110 may comprise suitable circuitry for performing headend related functions, such as within a particular distribution topology—e.g., for particular type of communication setup, using one or more particular protocol(s), and/or via particular type(s) of connections. For example, headend 110 may be configured for receiving signals (e.g., television signals or other media based signals) from one or more sources, for processing and distribution over a particular distribution system—e.g., a satellite distribution topology, a cable distribution topology, a terrestrial distribution topology, or a combination thereof.

The in-premises network 130 may comprise a local network configured, setup and/or used within a particular premises 131 (e.g., residential or commercial), to enable providing services within the premises 131. The services may comprise broadband access/interactivity, access to television (or other similar multimedia or content distribution) broadcasts, and the like. Each in-premises network 130 may comprise a plurality of devices that may be used in conjunction with services and/or functions available in the network. For example, the in-premises network 130 may comprise at least one gateway 140 and one or more client devices 150.

The gateway 140 may comprise suitable circuitry for providing and/or supporting various services or functions in a particular location (e.g., the in-premises network 130), such as to a plurality of client devices (e.g., the client devices 150) present in that location. The gateway 140 may communicate with the client devices 150 over point-to-point or indirect links 180. The services or functions that may be provided and/or supported by the gateway 140 may pertain to, for example, broadband access, broadcast/television access, content distribution, and the like. In this regard, the gateway 140 may be configured to support reception of signals communicated from external entities (e.g., cable, terrestrial, satellite, and/or IP head-ends), and process the signals as necessary for obtaining data (e.g., content) carried thereby, and outputting the data via corresponding signals over the internal links 180 to the client devices 150. Similarly, the gateway 140 may be operable to receive signals communicated from the client devices 150, over the internal links 180, and process the signals as necessary for obtaining data and outputting the data via corresponding signals to the external entities. Accordingly, the term "gateway" in this disclosure refers to devices that may perform set-top box (STB) and/or receiver functions (e.g., for satellite, cable, terrestrial television, or the like), over-the-air reception (e.g., a DBS satellite dish assembly), WAN/LAN modem functions, and the like. In this regard, "set-top box" or "receiver" functions may comprise functions utilized in receiving and/or processing signals (carrying data) from head-ends (e.g., cable, satellites, and/or broadband head-ends), web servers, and the like to devices within the premises.

In some instances, at least some of the data utilized in the in-premises network 130 may be received from external sources, such as from broadband or broadcast sources (e.g., satellites, the terrestrial TV head-ends, and/or the cable head-ends). In this regard, the gateway 140 may be utilized to service the in-premises network 130, such as, for example, by providing to the client devices 150 access to external networks/connections. In such instances, the gateway 140 may facilitate communication of signals between the client devices 150 and the external sources. For example, the gateway 140 may be utilized to route communications between cable head-ends 120 and one or more of client devices 150. In this regard, a client device 150 may receive from the cable head-end 120 streams containing, e.g., multimedia content. In some instances, the interactions with the cable head-end may be bi-directional. For example, client device 150 may transmit to the cable head-end 120 signals or streams, such as those containing user commands or requests (e.g., for particular content) or the like. Communications between client devices and head-ends may be configured in accordance with one or particular protocol(s). For example, cable communications may be configured in accordance with DOCSIS protocol(s), satellite communications may be configured in accordance with DBS protocol(s), etc.

The client devices 150 may comprise devices which may be operable to utilize services or functions available in a particular location—e.g., those provided by the gateway 140. In this regard, the client devices 150 may be operable to communicate with the gateway 140, such as, for example, via one or more point-to-point links 180. For example, in instances where the gateway 140 is utilized to support broadband/television access and/or content distribution, the client devices 150 may comprise televisions and similar devices that may be used in consuming (e.g., displaying or playing) content that may be broadcasted (e.g., via terrestrial signals, satellite signals, cable signals, and/or over the Internet) and received via the gateway 140. The disclosure is not limited, however, to any particular type of client device. The links 180 between the gateway 140 and the client devices 150 may comprise, for example, wired, wireless, and/or optical links that may be suited for use in an environment such as the in-premises network. For example, the links 180 may comprise wired connections (e.g., HDMI connections, Display Port links, Multimedia over Coax Alliance (MoCA) links, Ethernet connections, or the like), and/or wireless connections (e.g., WiFi, ZigBee, wireless USB, or the like).

The distribution network 120 may comprise a system of interconnected resources (hardware and/or software), for facilitating exchange and/or forwarding of data (including, e.g., such functions as routing, switching, and the like) among a plurality of nodes (e.g., one or more headends and/or one or more user nodes), based on one or more networking standards. Physical connectivity within, and/or to or from the distribution network 120, may be provided using, for example, copper wires, fiber-optic cables, wireless links (including satellite links), and the like. For example, in instances where the communication system 100 may correspond to a cable distribution system, the distribution network 120 may correspond to coaxial based network, a fiber-optic based network, or a hybrid fibre-coaxial (HFC) based network. In instances where the communication system 100 may correspond to a satellite distribution system, the distribution network 120 may correspond to a plurality of land-based relay stations and a plurality of orbiting satellite nodes. In instances where the communication system 100 may correspond to a terrestrial distribution system, the distribution network 120 may correspond to plurality of land-based relay stations and a plurality of broadcast towers or antennas.

In operation, the communication system 100 may be used as a distribution system, for enabling distribution of data (e.g., multimedia or other content) to a plurality of end-users (e.g., client devices 150 in in-premises network 130). In this regard, the headend(s) 110 may be configured to generate or obtain (e.g., from other sources) data, and may process the data for distribution via communication system 100. The processing may comprise generating downstream signals 160 (e.g., television signals or other media based signals), configured in accordance with the interface(s) and/or standard(s) used within the communication system 100, for communication to the in-premises network 130. For example, in instances where the communication system 100 may be a cable distribution system, the headend 110 may generate the downstream signals 160 particularly for communication and/or distribution over coaxial, fiber, or HFC based interconnects. Further, in some instances, the communication system 100 may be configured to support upstream communications. In this regard, the in-premises network 130 may be operable to generate (and the headend 110 may be operable to receive and handle) upstream signals 170. The upstream signals 170 may be used, for example, to convey data (e.g., user generated content), user inputs/commands (e.g., requests for particular content), control data (e.g., status, errors, etc.), and the like.

Within the in-premises network 130, the gateway 140 and the client devices 150 may communicate with one another via the internal links 180 (e.g., HDMI connections, MoCA, WiFi, etc.). For example, the gateway 140 may receive the downstream signals 160, and may extracted data carried therein (e.g., television or other multimedia content), and may then distribute that data within the in-premises network 130 using signals communicated over the internal links 180. In uplink communications, the gateway 140 may receive (e.g., from the client devices 150) signals communicated within the in-premises network 130, may process these signals (such as to extract data carried therein), and may generate and transmit corresponding upstream signals 170, to the headends 110 (or other external entities, accessible via external networks, such as the distribution network 120).

In some instances, internal and external communications of local (e.g., in-premises) networks may adversely affect each other. For example, in instances where physical mediums used for internal and external communications are shared by or common (or near-common—e.g., being sufficiently close, such as corresponding to close portions in the RF spectrum) to both connections, internal communications may adversely affect external connectivity and/or communications (and vice versa), unless measures are taken to mitigate and/or alleviate such effects. For example, with reference to the network topology depicted in FIG. 1, the distribution system 100 may correspond to, for example, a cable distribution topology, whereby connections to the in-premises networks (e.g., the in-premises network 130) may be configured as DOCSIS based connections. Further, the internal connections 180 may comprise MoCA connections. In such a scenario, communication over the internal (MoCA) connections 180 may affect external (DOCSIS based) connectivity of the in-premises network 130. In this regard, the internal MoCA connections (and signals communicated over them) may, for example, cause interference to, or even overlap with DOCSIS signals communicated to and/or from the in-premises network 130—that is to/from external entities (e.g., the headend 110).

Accordingly, in various implementations of the present disclosure, internal connectivity within local (e.g., in-premises networks, such as the in-premises network 130) may be adaptively setup, configured and/or managed, particularly to assess, and/or guard against and/or mitigate, undesired effects to external communications of coexisting external networks—that is communications external to the local networks, using connections sharing or using common (or near-common) physical mediums.

The adaptive management of internal connectivity/communications may comprise assessing and/or estimating effects of internal and external communication on each other. This may comprise, for example, determining the physical mediums that would be used for internal and external communication, and determining if cross-effects are possible during concurrent internal and external communications. This may also comprise, for example, analyzing the topology of the local network 130 (e.g., number of devices, location of devices, attenuation between devices, etc.) to assess characteristics of internal communications and/or to determine parameters and/or information that may be pertinent to any adjustments to these internal connections and/or communications In some implementations, a particular device within the local network may be configured (e.g., as "network manager") to apply such adaptive management of internal connectivity and/or communications. The network manager may be selected from candidate devices (e.g., available devices in the local network). Selecting a device for configuration as network manager, from the candidate devices, may be made based on selection criteria, comprising parameters and/or information pertinent for determining suitability of the device for performing such management functions. For example, selection criteria may comprise having or using both internal and external connectivity, comprising particular resources (e.g., processing, storage, sensory, etc.) that would be required for performing management related functions and/or operations, being able to determine parameters and/or activity of external networks, being configurable as a multi-network aware device—e.g., being able to determine parameters and/or activity of the local network and the external networks (such as any cable or satellite networks to which the local network may have access or be connected), etc.

For example, with reference to the network topology depicted in FIG. 1, when the in-premises network 130 is setup and/or configured, once the gateway 140 is powered up and connected to the in-premises network 130, and external connectivity (e.g., to the distribution network 120) is complete, it may be selected as the best candidate for functioning as network manager, and thus may be assigned to be (and configured as) the network manager of the in-premises network 130. Once the gateway 140 is configured as the network manager, it may manage the internal (e.g., MoCA) communications (e.g., adaptively allocating bandwidth and/or other communication parameters to each internal connection/link and/or communication) within the in-premises network 130, to ensure that internal communications are performed in a manner that specifically accommodates communications of the coexisting (external) network(s) which may share or have common/near-common physical medium(s) (e.g., physical mediums that may be affected by the internal MoCA communications, such as cable/DOCSIS communications).

In an example implementation, managing the internal communications may be based on a topology of the local network (e.g., the in-premises network 130). In this regard, assessing the topology of the local network may comprise, for example, determining a number of devices, location of devices, attenuation between devices, etc. For example, once the gateway 140 is configured as the network manager of the in-premises network 130, it may determine the topology of the in-premises network 130—e.g., determining what devices are in the network (e.g., the client devices $150_1$-$150_N$), determining a location of the devices (e.g., within the premises 131, and/or relative to one another, to the gateway 140, and/or to points-of-contact with external coexisting networks, where internal communications may affect external communications, etc.), and/or assessing potential effects between the devices (e.g., attenuation between devices). The gateway 140 may then manage the internal connectivity and/or communication within the in-premises network 130 (e.g., adaptively allocating bandwidth and/or other communication parameters) based on the topology of the in-premises network 130—e.g., when attempting to determine how to accommodate communications of the coexisting (external) networks (e.g., mitigating potential adverse effects thereto).

For example, in a use scenario where the client device $150_1$ near the gateway device 140 requests a communication link to client device $150_N$, which may be "deep" within the (MoCA) in-premises network 130 (e.g., behind two splitters and a substantial length of coaxial cable from the client device 1500, the gateway device 140 may recognize that the client device $150_1$ may need to transmit very strong (e.g., MoCA) signals. Accordingly, the bandwidth allocated for the communication from the client device $150_1$ to the client device $150_4$ by the gateway 140 may be selected to be as far away as possible from the portion of the spectrum occupied by the cable band(s). Conversely, where the client devices (e.g., the client devices $150_3$ and $150_N$) are relatively close to one another (and/or are relatively far from the gateway 140 and/or the point-of-contact with coexisting external networks), communication between the devices may be low-signal strength communications. Thus, these communications may be allocated (if needed) bandwidth that may be close to the cable band. An example of such adaptive bandwidth allocation scheme is described in more detail with respect to FIG. 3.

In an example implementation, managing the internal communications may be based on activity and/or characteristics of coexisting external networks to which the local network may have access or be connected), connections thereto, and/or (external) communications therewith. Thus, adaptive management of the internal connectivity and/or communications may comprise monitoring external connectivity and/or communications, and adjusting internal connectivity and/or communications based on that monitoring. In the above described DOCSIS/MoCA topology, for example, current and/or expected cable (DOCSIS) activities may be monitored and used in managing the MoCA communications (e.g., in allocating MoCA bandwidth). For example, attempting to allocate to the most problematic MoCA communications (e.g., communications with high signal strength near the gateway 104) in distant bands may result in increased latency for such communications, such as while those distant bands are being occupied by other transmissions. In instances where little or no cable/DOCSIS activity is expected during the MoCA communication, however, and/or in instances where cable/DOCSIS channels needed during the MoCA communication may be in portions of the cable spectrum that are sufficiently far from the MoCA spectrum, then MoCA bands close to the cable band may be granted for such a MoCA communications. In some instances, the activity and/or characteristics of external communication may be analyzed in conjunction with other factors, such as Quality of Service (QoS) requirements, potential for interference, and/or network topology, when managing the internal communications (e.g., allocating bandwidth for MoCA communications).

Figure 2:
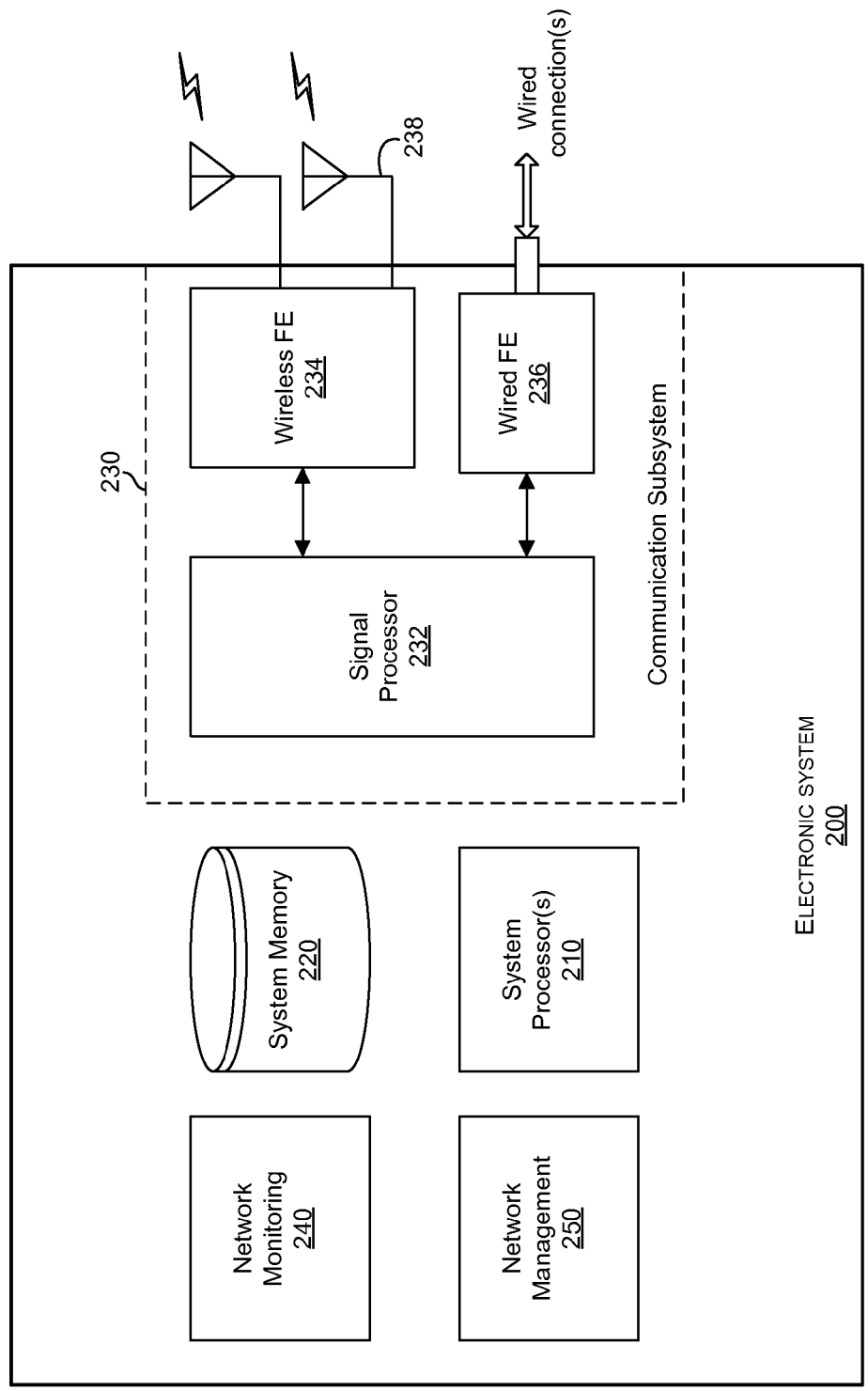
FIG. 2 illustrates an example electronic system that may be configured to provide adaptive bandwidth allocation within shared network infrastructure.

FIG. 2 illustrates an example electronic system that may be configured to provide adaptive bandwidth allocation within shared network infrastructure. Referring to FIG. 2, there is shown an electronic system 200. Referring to FIG. 2, there is shown an electronic system 200.

The electronic system 200 comprises suitable circuitry for implementing various aspects of the present disclosure. For example, the electronic system 200, as used herein, may comprise suitable circuitry for performing or supporting various functions, operations, applications, and/or services. The functions, operations, applications, and/or services performed or supported by the electronic system 200 may be run or controlled based on pre-configured instructions and/or user instructions. For example, the electronic system 200 may be configured and/or implemented as a network element, for use in receiving and/or handling broadcasts (e.g., satellite, cable, terrestrial broadcast, broadband, etc.) or similar types of communications. For example, the electronic system 200 may correspond to (at least portion of) a set-top box, DBS satellite dish assembly, or the like. In that respect, the electronic system 200 may correspond to, for example, the gateway 140 of FIG. 1.

In an example implementation, the electronic system 200 may comprise one or more system processors 210, a system memory 220, a communication subsystem 230, a network monitoring block 240, and a network management block 250.

The system processor 210 may comprise suitable circuitry for processing data, for executing or running particular services, tasks and/or applications, and/or for controlling and/or managing operations (e.g., of other components in the electronic system 200). For example, the system processor 210 may configure and/or control operations of various components and/or subsystems of the electronic system 200, by utilizing, for example, one or more control signals. Further, the system processor 210 may also enable running and/or execution of applications, programs and/or code, which may be stored, for example, in the system memory 220. The system processor 210 may comprise a general purpose processor (e.g., central processing unit (CPU)), which may be configured to perform or support particular types of operations (e.g., audio related operations). Alternatively, the system processor 210 may comprise a special purpose processor—e.g., a digital signal processor (DSP), a baseband processor, and/or an application processor (e.g., ASIC).

The system memory 220 may comprise suitable circuitry for providing permanent and/or non-permanent storage, buffering, and/or fetching of data, which may be used, consumed, and/or processed in the electronic system 200. In this regard, the system memory 220 may comprise different memory technologies, including, for example, read-only memory (ROM), random access memory (RAM), Flash memory, solid-state drive (SSD), and/or field-programmable gate array (FPGA). The system memory 220 may store, for example, configuration data, which may comprise parameters and/or code, comprising software and/or firmware.

The communication subsystem 230 may comprise suitable circuitry for supporting communication of data to and/or from the electronic system 200. For example, the communication subsystem 230 may comprise a signal processor 232, a wireless front-end 234, a wired front-end 236, and one or more antennas 238. The signal processor 232 may comprise suitable circuitry for processing signals transmitted and/or received by the electronic system 200, in accordance with one or more wired or wireless protocols supported by the electronic system 200. The signal processor 232 may be operable to perform such signal processing operations as filtering, amplification, up-conversion/down-conversion of baseband signals, analog-to-digital conversion and/or digital-to-analog conversion, encoding/decoding, encryption/decryption, and/or modulation/demodulation.

The wireless front-end 234 may comprise circuitry for performing wireless transmission and/or reception (e.g., via the antenna(s) 238), such as over a plurality of supported RF bands. The antenna(s) 238 may comprise suitable circuitry for facilitating over-the-air transmission and/or reception of wireless signals, such as within certain bandwidths and/or in accordance with one or more wireless interfaces supported by the electronic system 200.

The wired front-end 236 may comprise suitable circuitry for performing wired based transmission and/or reception, such as over a plurality of supported physical wired media. The wired front-end 236 may support communications of RF signals via the plurality of wired connectors, within certain bandwidths and/or in accordance with one or more wired protocols (e.g., Ethernet) supported by the electronic system 200.

The network monitoring block 240 may comprise suitable circuitry for monitoring network(s) that may be serviced, controlled, and/or administered via the electronic system 200. For example, the network monitoring block 240 may be operable to determine and/or assess network topologies, determine and/or assess characteristics of networks and/or network connections, monitor activities of network connections, and the like. The disclosure is not limited, however, to any particular type of activities that may be constitute network monitoring, and the network monitoring block 240 may be configured to perform any monitoring function that may be needed to provided required information (e.g., for use in applying adaptive management of a particular network).

The network management block 250 may comprise suitable circuitry for managing network(s) that may be serviced, controlled, and/or administered via the electronic system 200. For example, the network management block 250 may be operable to analyze and/or assess characteristics, parameters, conditions and/or activities of managed network(s) and/or devices or other elements (or resources) in managed network(s), and/or effects of these conditions and/or activities and/or communications via available connections (internal and/or external) on one another. In some instances, the network management block 250 may be operable to set and/or adjust network related parameters and/or operational criteria. Further, in some example implementations, the network management block 250 may be configurable to implement and/or apply a management scheme aimed at optimizing particular considerations. For example, the network management block 250 may be operable to implement and/or apply adaptive management schemes for optimizing internal connectivity and/or communication in local network (s), such as by enhancing internal connectivity and/or communication while mitigating and/or reducing potential adverse effects on coexisting external networks (or communications therewith).

In operation, the electronic system 200 may be configured as a network element in a local network (e.g., corresponding to the gateway 140 of the in-premises network 130). In this regard, the electronic system 200 may be operable to support communications. For example, the communication subsystem 230 may be utilized in setting up and/or utilizing connections that may be used in communicating data to and/or from the electronic system 200 (e.g., within a local network managed via the electronic system and/or external to any such local network). The connections may be established using wired and/or wireless links (via the wired front-end 236 and/or the wireless front-end 234, respectively).

In some instances, the electronic system 200 may be configured to support network management operations in a network in which the electronic system 200 may be integrated. In this regard, the network monitoring block 240 may be used to monitor the managed network (and/or network elements therein) and/or other coexisting (e.g., external) within the managed network interacts and/or communicates. The monitoring may result in obtaining information relating to network topology, network (and/or network elements) conditions and/or activities, etc. Further, the network management block 250 may be used to set (or adjust) network and/or communication parameters or criteria (e.g., allocating bands/bandwidths to requested or expected communications). In this regard, the network management block 250 may set and/or adjust the parameters based on analysis of the information obtained from monitoring performed by the network monitoring block 240. Further, the setting and/or adjusting the parameters may be based on pre-set or pre-configured criteria.

In an example implementation, the electronic system 200 may be used to provide adaptive management of a local network (e.g., the in-premises network 130 of FIG. 2), particularly with respect to ensuring accommodation of coexisting external networks that may share or use common (or near-common) physical mediums as those used in the internal connections/communications. For example, the network monitoring block 240 and/or the network management block 250 of the electronic system 200 may be used in conjunction with providing adaptive management operations—e.g., when the electronic system is configured for functioning as a "network manager" of the in-premises network 130, substantially as described with respect to FIG. 1. For example, the network monitoring block 240 may be used to determine the topology of the in-premises network 130, determine and/or monitor conditions and/or activities of the in-premises network 130 and/or the network elements therein (e.g., the client devices $150_1$-$150_N$). The network monitoring block 240 may also be used to determine and/or assess characteristics, conditions and/or activities of coexisting external network(s) to which the in-premises network 130 may have access or be connected (e.g., the distribution network 120). The network management block 250 may then analyze the obtained information, to set and/or adjust internal connectivity and/or communications within the in-premises network 130, particularly to mitigate and/or reduce (as much as possible) adverse effects on external communications (e.g., communications via connections with the distribution network 120).

Figure 3:
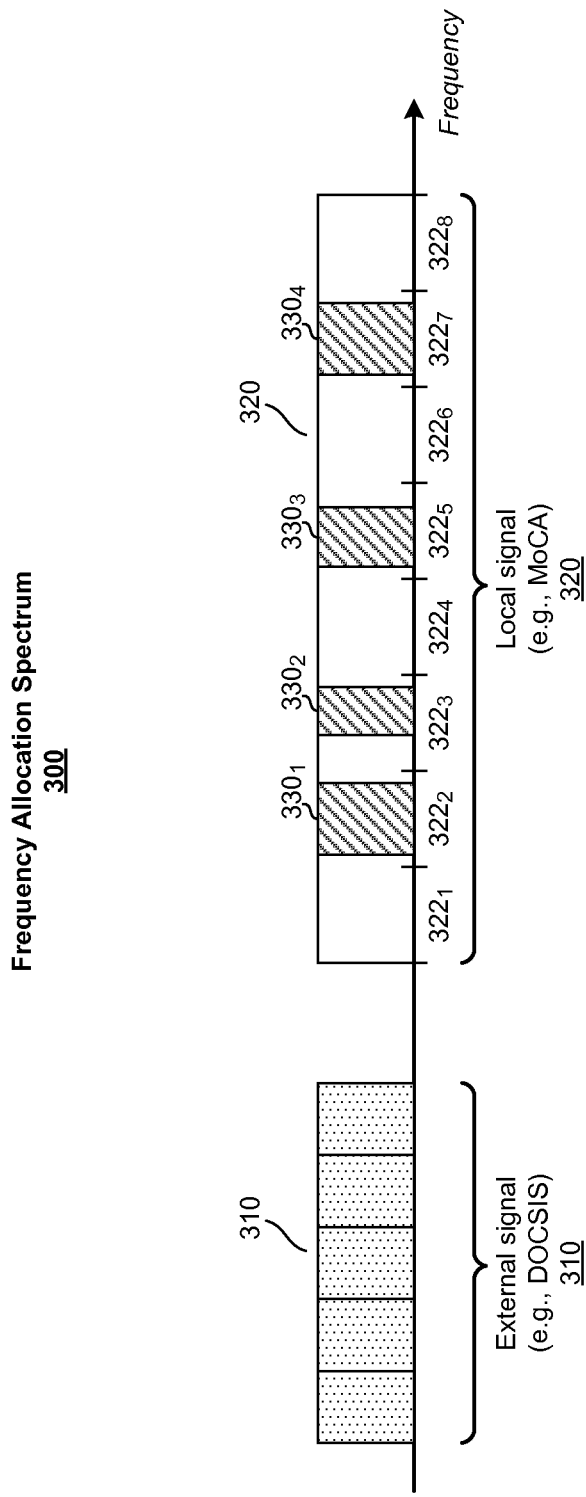
FIG. 3 illustrates an example allocation scenario for a local in-premises network that shares physical mediums with an external network.

FIG. 3 illustrates an example allocation scenario for in local in-premises network that shares physical mediums with an external network. Referring to FIG. 3, there is shown a frequency graph 300 which may be used during frequency allocation operations—e.g., during adaptive management in a local network, such as the in-premises network 130, substantially as described with respect to FIG. 1.

As shown in frequency graph 300, different portions of the frequency spectrum may be assigned to different types of communication For example, frequency spectrum portion 310 may be assigned for use in conjunction with cable/DOCSIS communication (e.g., external connections/communications of the in-premises network 130) whereas frequency spectrum portion 320 may be assigned for use in conjunction with MoCA communication (e.g., internal connections/communications within in-premises network 130). In this regard, the frequency spectrum portion 320 may be divided into a plurality of bands (e.g., bands $322_1$-$322_8$), each of which may be assignable to an internal (MoCA) communication link. The assignment of the bands $322_1$-$322_8$ may be performed in an adaptive manner, such as based on an adaptive determination of expected effects on coexisting external communications (e.g., DOCSIS communications using signals assigned to the frequency spectrum band 310). Thus, each of the internal communication links may be assigned one of bands $322_1$-$322_8$ as to best reduce possible adverse effects to DOCSIS communication.

For example, as described with respect to FIG. 1, in a use scenario where the client device $150_1$ near the gateway device 140 requests a communication link to client device $150_N$, which may be "deep" within the (MoCA) in-premises network 130 (e.g., behind two splitters and a substantial length of coaxial cable from the client device $150_1$), the gateway device 140 may allocate bandwidth $330_4$ (within the band $332_7$) for the communication from the client device $150_1$ to the client device $150_4$, due to determination by the gateway 140 that the client device $150_1$ would need to transmit very strong (e.g., MoCA) signals. In this regard, the bandwidth $330_4$ (within the band $332_7$) may be selected based on a determination that it is sufficiently far from the frequency spectrum portion 310 occupied by the cable/DOCSIS band(s). On the other hand, the gateway device 140 may allocate bandwidth $330_1$ (within the band $332_2$) for the communication from the client device $150_3$ to the client device $150_N$, based on a determination by the gateway 140 that these devices are relatively close to one another (thus allowing for low-signal strength communications) and/or are relatively far from the gateway 140 and/or the point-of-contact with coexisting external networks), such that the bandwidth allocated thereto maybe close to the frequency spectrum portion 310 occupied by the cable/DOCSIS band(s).

While the implementation described herein is frequency (allocation) based, the disclosure is not so limited, and a similar approach for other allocating schemes may also be used. For example, in some instances, time-division approach may be used—e.g., time-slot may be configured and/or used for internal and/or external communication), with the allocation of the time-slots by assigned based on similar considerations.

Figure 4:
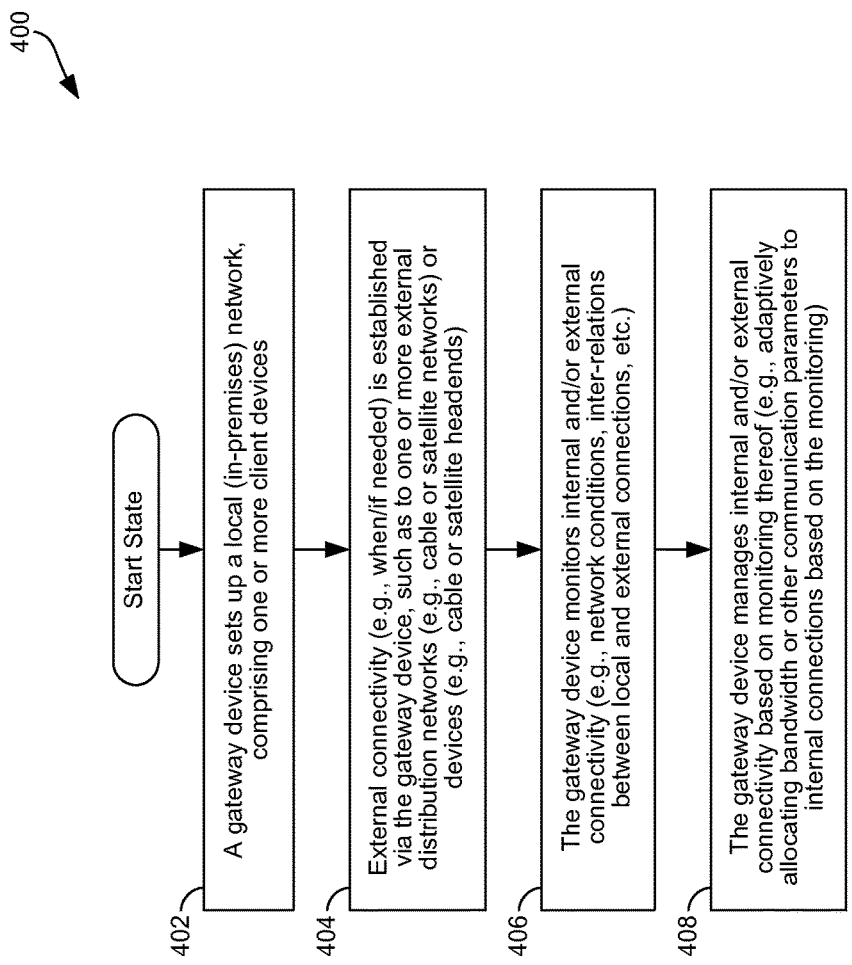
FIG. 4 is a flowchart illustrating an example process for adaptively managing internal connectivity and/or communication in a local network.

FIG. 4 is a flowchart illustrating an example process for adaptively managing internal connectivity and/or communication in a local network. Referring to FIG. 4, there is shown a flow chart 400, comprising a plurality of example steps.

In step 402, a network device (e.g., a gateway device, such as the gateway 140) may be used to set up in a local (e.g., in-premises) network, comprising one or more client devices. In this regard, the local network may be serviced and/or managed by the network device. In step 404, external connectivity (e.g., when/if needed) may be established via the gateway device, such as to one or more external distribution networks (e.g., cable or satellite networks) or devices (e.g., cable or satellite headends). In step 406, the gateway device may monitor internal and/or external connectivity—e.g., network conditions, inter-relations between local and external connections, etc. In step 408, the gateway device may manage internal and/or external connectivity based on monitoring thereof—e.g., adaptively allocating bandwidth or other communication parameters to internal connections based on the monitoring.

Figure 5:
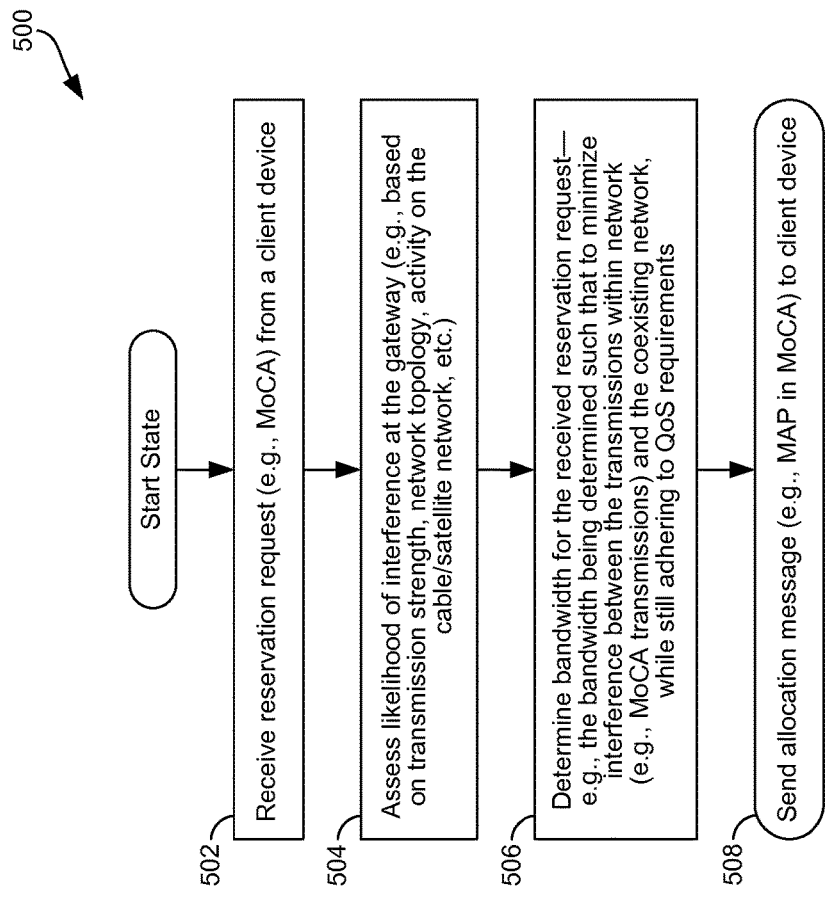
FIG. 5 is a flowchart illustrating an example process for bandwidth allocation in a local in-premises network that shares a physical medium with another external network.

FIG. 5 is a flowchart illustrating an example process for bandwidth allocation in local in-premises network that shares a physical medium with another external network. Referring to FIG. 5, there is shown a flow chart 500, comprising a plurality of example steps.

In step 502, a reservation request (e.g., MoCA) may be received by a network manager from a client device. In step 504, the network manager may assess likelihood of interference by communication of the requesting client device—e.g., based on transmission strength, network topology, activity on the cable/satellite network, etc. In step 506, bandwidth for the received reservation request may be determined—e.g., the bandwidth being determined such that to minimize interference between the transmissions within network (e.g., MoCA transmissions) and the coexisting network, while still adhering to QoS requirements. In step 508, an allocation message (e.g., MAP in MoCA) may be sent back to the client device.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for non-intrusive noise cancelation.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form. Accordingly, some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed:

1. A method, comprising:
   managing via a network device internal connections and/or communications within a local network, wherein the managing comprises:
   assessing effects of the internal connections and/or communications on external connections and/or communications with one or more devices and/or networks external to the local network; and
   setting and/or adjusting based on the assessed effects, one or more communication parameters associated with each one of the internal connections and/or communications.

2. The method of claim 1, wherein the network device comprises a gateway device configured to provide services to the local network, the services comprising providing access to and/or connectivity with the one or more devices and/or networks external to the local network.

3. The method of claim 1, wherein the internal connections and/or communications comprise connections between pairs of client devices within the local network, and/or between the network device and one of the client devices.

4. The method of claim 1, wherein the effects of the internal connections and/or communications result from utilizing one or more physical mediums that are shared with and/or are commonly used by the external connections and/or communications with one or more devices and/or networks external the local network.

5. The method of claim 1, wherein assessing effects of the internal connections and/or communication comprises:

determining spectrum portions that are allocated for internal connections and/or communications;

determining spectrum portions that are allocated for external connections and/or communications with the one or more of the devices and/or networks external the local network; and assessing effects of communication when using each of one or more bands within the spectrum portions that are allocated for internal connections and/or communications, on the external connections and/or communications using the spectrum portions that are allocated for external connections and/or communications.

6. The method of claim 5, wherein setting and/or adjusting the one or more communication parameters based on the determined effects comprises: assigning each requested internal connection to one of the one or more bands within the spectrum portions that are allocated for internal connections and/or communications based on the determined effects of communication via the one of the one or more bands.

7. The method of claim 1, wherein managing the internal connections and/or communications comprises assessing one or more of:

conditions and/or activities of one or more of the networks external to the local network; and parameters associated with one or more of the external connections and/or communications.

8. The method of claim 7, comprising setting and/or adjusting the one or more communication parameters associated with at least one of the internal connections and/or communications based on assessed conditions and/or activities of one or more of the networks external to the local network and/or the assessed parameters associated with one or more of the external connections and/or communications.

9. The method of claim 1, wherein managing the internal connections and/or communications comprises determining topology of the local network.

10. The method of claim 9, wherein determining the topology of the local network comprises determining number of devices in the local network, location of each of the devices in the local network, and/or effects of each of the devices in the local network on communications by one or more other devices in the local network.

11. A system, comprising:

one or more circuits for use in a network device, the one or more circuits being operable to manage internal connections and/or communications within a local network, wherein the managing comprises:

assessing effects of the internal connections and/or communications on external connections and/or communications with one or more devices and/or networks external the local network; and setting and/or adjusting based on the assessed effects, one or more communication parameters associated with each one of the internal connections and/or communications.

12. The system of claim 11, wherein the network device comprises a gateway device configured to provided services to the local network, the services comprising providing access to and/or connectivity with the one or more devices and/or networks external the local network.

13. The system of claim 11, wherein the internal connections and/or communications comprise connections between pairs of client devices within the local network, and/or between the network device and one of the client devices.

14. The system of claim 11, wherein the effects of the internal connections and/or communications result from utilizing one or more physical mediums that are shared with and/or are commonly used by the external connections and/or communications with one or more devices and/or networks external the local network.

15. The system of claim 11, wherein assessing effects of the internal connections and/or communication comprises:

determining spectrum portions that are allocated for internal connections and/or communications;

determining spectrum portions that are allocated for external connections and/or communications with the one or more of the devices and/or networks external the local network; and assessing effects of communication when using each of one or more bands within the spectrum portions that are allocated for internal connections and/or communications, on the external connections and/or communications using the spectrum portions that are allocated for external connections and/or communications.

16. The system of claim 15, wherein setting and/or adjusting the one or more communication parameters based on the determined effects comprises: assigning each requested internal connection to one of the one or more bands within the spectrum portions that are allocated for internal connections and/or communications based on the determined effects of communication via the one of the one or more bands.

17. The system of claim 11, wherein managing the internal connections and/or communications comprises assessing one or more of:

conditions and/or activities of one or more of the networks external to the local network; and parameters associated with one or more of the external connections and/or communications.

18. The system of claim 17, wherein the one or more circuits are operable to set and/or adjust the one or more communication parameters associated with at least one of the internal connections and/or communications based on assessed conditions and/or activities of one or more of the networks external to the local network and/or the assessed parameters associated with one or more of the external connections and/or communications.

19. The system of claim 11, wherein managing the internal connections and/or communications comprises determining topology of the local network.

20. The system of claim 19, wherein determining the topology of the local network comprises determining number of devices in the local network, location of each of the devices in the local network, and/or effects of each of the devices in the local network on communications by one or more other devices in the local network.

* * * * *